| United States Patent [19] | [11] Patent Number: 4,588,508 |
| Allenson et al. | [45] Date of Patent: May 13, 1986 |

[54] BIMODAL CATIONICS FOR WATER CLARIFICATION

[75] Inventors: Stephan J. Allenson, Richmond, Tex.; Stephen D. Wagner, Bakersfield, Calif.

[73] Assignee: Nalco Cehmical Company, Oak Brook, Ill.

[21] Appl. No.: 670,518

[22] Filed: Nov. 13, 1984

[51] Int. Cl.$^4$ ................................................ C02F 1/56
[52] U.S. Cl. ................................ 210/708; 210/712; 210/728; 210/734; 210/738
[58] Field of Search ............... 209/5; 210/708, 710, 210/712, 713, 725, 727, 728, 732–736, 769, 738

[56] References Cited

U.S. PATENT DOCUMENTS

| | | | |
|---|---|---|---|
| 3,377,274 | 4/1968 | Burke et al. | 210/727 |
| 3,409,546 | 11/1968 | Mogelnicki et al. | 210/734 |
| 3,509,021 | 4/1970 | Woodward | 210/734 |
| 3,617,563 | 11/1971 | Ries | 210/727 |
| 3,707,464 | 12/1972 | Burns et al. | 210/705 |
| 3,717,574 | 2/1973 | Werneke | 209/5 |
| 3,835,084 | 9/1974 | Azorlosa et al. | 210/728 |
| 3,960,584 | 6/1976 | Savage | 106/178 |
| 3,994,806 | 11/1976 | Rausch et al. | 210/728 |
| 4,059,515 | 11/1977 | Fowler et al. | 210/736 |
| 4,098,693 | 7/1978 | Tonkyn et al. | 210/728 |
| 4,217,209 | 8/1980 | Steffan et al. | 210/727 |
| 4,251,363 | 2/1981 | Chamberlain et al. | 210/727 |
| 4,332,779 | 6/1982 | Thibodeau et al. | 423/320 |

*Primary Examiner*—Peter Hruskoci
*Attorney, Agent, or Firm*—John G. Premo; Donald G. Epple

[57] ABSTRACT

A polymer admixture comprising a first cationic polymer having a molecular weight between about 2,500–1,000,000 in admixture with a second cationic polymer having a molecular weight between about 1,000,000–50,000,000 wherein said admixture contains a weight ratio of first polymer to second polymer between about 50:1 to 1:50, has greatly improved properties for treating and clarifying waste waters contaminated with oily waste and dispersed solids. The first cationic polymer is preferably a homopolymer, and the second cationic polymer is preferably a copolymer of acrylamide containing the same cationic monomer used to synthesize the first cationic polymer.

5 Claims, No Drawings

BIMODAL CATIONICS FOR WATER CLARIFICATION

INTRODUCTION

The use of cationic polymers to clarify waste waters is known in the art. In addition, cationic polymers have been combined with anionic polymers to achieve improved results.

However, the use of these combinations of polymers still do not provide sufficient clarity when treating waters which are contaminated with oily waste matter as well as highly dispersed solid materials. These kinds of waste waters which are contaminated with oily organic waste matter as well as highly dispersed solid material, either of an inorganic or an organic nature or, perhaps, combinations thereof, present what has been to data an impossible task in regards to the geneal cleanup of waters which have been contaminated in this manner. Waters of the type mentioned above include ground waters found in petroleum recovery oil fields as well as ground waters and waste waters found in the refinery operations themselves. In addition, these highly contaminated waters may also include process waters such as ethylene quench waste water and drilling mud waste waters.

Any refinery process water, petroleum chemical waste water, ballast waste water, river water, underground feed water, ethylene quench waste water, oil-in-water waste emulsions from oil recovery fields, and the like are difficult contaminated waters requiring chemical treatment and clarification and present extreme difficulty in this treatment and clarification process.

If one were to successfully treat these kinds of waste waters which contain oily waste matter as well as dispersed solid matter of an organic or inorganic nature, one could advance the art of treating and clarifying contaminated waters of this type.

It is, therefore, an object of this invention to disclose a polymer admixture which successfully treats and clarifies contaminated waters containing oily waste matter and dispersed solids of either an organic or inorganic nature.

It is also an object of this invention to treat and clarify these oily waste and dispersed solid contaminated waters with a combination of polymers of a prescribed nature and having a prescribed molecular weight relationship.

Another object of this invention is to describe a polymer admixture which may be used effectively to treat and clarify contaminated waste wasters, wherein said waste waters contain oily waste matter as well as dispersed inorganic or organic solid matter.

It is another object of this invention to describe a particular polymeric admixture of cationic polymers having a bimodal weight average molecular weight distribution and wherein the admixture of polymers contains a first cationic polymer with a relatively low molecular weight distribution as well as a second cationic polymer which has a relatively high molecular weight distribution.

THE INVENTION

We have discovered that a combination of cationic polymers having a molecular weight distribution which presents a bimodal molecular weight distribution of cationic polymers effectively treats and clarifies waters contaminated with oily waste matter and dispersed inorganic and/or organic solid matter.

The polymer admixture which is effective for treating and clarifying waters contaminated with oily waste and dispersed solids comprises:

(a) a first cationic polymer having a weight average molecular weight ranging between about 2,500–1,000,000, in admixture with (b) a second cationic polymer having a weight average molecular weight ranging between about 1,000,000–50,000,000, wherein said polymer admixture contains a weight ratio of a:b ranging between about 50:1 to 1:50.

The polymer admixture described above preferably contains a first cationic polymer which has a weight average molecular weight ranging between about 5,000–800,000 and a second cationic polymer having a weight average molecular weight ranging between about 5,000,000–35,000,000.

The First Cationic Polymer

The first cationic polymer may be a homopolymer or a copolymer of a vinylic cationic monomer or it may be a polymer which has been synthesized by condensation methods, for example the condensation reaction of ethylene dichloride and ammonia. Preferably, however, the first cationic polymer is a homopolymer or a copolymer of a vinylic cationic monomer chosen from the group consisting of DADMAC, DMAEM, DMAEA, MAPTAC, AMPIQ, DEAEA, DEAEM, DMAEAcAm, DMAEMAcAm, DEAEAcAm, DEAEMAcAm, and their acid and quaternized salts.[1]

[1] See Glossary

Preferably, the first cationic polymer is a homopolymer of a vinylic cationic monomer, said homopolymer having a weight average molecular weight ranging between about 2,500–1,000,000 and said vinylic cationic monomer being chosen from the group consisting of DADMAC, MAPTAC, AMPIQ, as well as DMAEM, DMAEA, DEAEM, DEAEA, DMAEAcAm, DEAEAcAm, DMAEMAcAm, DEAEMAcAm, and their acid and quaternized salts and the like.

Most preferably, the first cationic polymer is a homopolymer of a vinylic cationic monomer chosen from the group consisting of DADMAC, MAPTAC, DMAEM, DMAEA, and their acid and quaternized salts, and having a molecular weight ranging between about 5,000–800,000.

As stated before, the first cationic polymer may also be a condensation polymer. The cationic condensation polymers are represented by those polymers achieved by adding closely controlled stoichometric quantities of difunctional or multifunctional chemicals to one another in a manner which would condense at a common nitrogen atom to form multi-chained molecules. Examples of such condensation polymers include, but are not limited to, the condensation reaction between ethylene dichloride and ammonia, the condensation reaction between ethylene dichloride and methylamine, the condensation reaction between epichlorohydrin and dimethylamine, the condensation reaction between epichlorohydrin, ethylene oxide or propylene oxide, and ammonia or other alkyl-substituted amine compounds, and the like.

When the first cationic polymer is a condensation polymer, it is preferred that the condensation polymer have a molecular weight within the range of about 2,500–1,000,000 and, preferably, in the range of about 2,500–500,000.

The Second Cationic Polymer

The second cationic polymer normally has a weight average molecular weight ranging between about 1,00,000–50,000,000. Preferably, the second cationic polymer has a weight average molecular weight ranging between about 5,000,000–35,000,000 and is a copolymer of either acrylamide or methacrylamide with a vinylic cationic monomer chosen from the group consisting of DADMAC, DMAEM, DMAEA, MAPTAC, AMPIQ, DEAEA, DMAEAcAm, DMAE methAcAm, and their acid and quaternized salts. In another preferred embodiment, the second cationic copolymer of acrylamide or methacrylamide has a weight average molecular weight ranging between about 5,000,000–35,000,000 and is a copolymer of either acrylamide or methacrylamide with the same vinylic cationic monomer which is contained in the first cationic polymer.

The Admixture

The polymer admixture which is used for treating and clarifying waters contaminated with oily waste and dispersed solids normally comprises;

(a) a first cationic homopolymer of a vinylic cationic monomer, said homopolymer having a weight average molecular weight ranging between about 2,500–1,000,000, in admixture with (b) a second cationic copolymer of acrylamide with the identical vinylic cationic monomer used in the homopolymer above, said copolymer having a weight average molecular weight ranging between about 1,000,000–50,000,000, wherein said polymer admixture contains the first cationic homopolymer and second cationic copolymer in the weight ratio ranging between about 50:1 to about 1:50.

The polymer admixture most useful for treating and clarifying waters contaminated with oily waste and dispersed solids comprises a homopolymer of a vinylic cationic monomer chosen from the group consisting of DADMAC, MAPTAC, DMAEM, DMAEA, and their acid and quaternized salts in admixture with a copolymer of acrylamide with a vinylic cationic monomer chosen from the group consisting of DADMAC, MAPTAC, DMAEM, DMAEA, and their acid and quaternized salts, and wherein the homopolymer has a weight average molecular weight between about 2,500–1,000,000 and the copolymer has a weight average molecular weight between about 1,000,000–50,000,000, and wherein the weight ratio of homopolymer to copolymer is between about 50:1 to 1:50.

In a preferred embodiment, the polymer admixture contains a homopolymer and a copolymer which are synthesized using the same vinylic cationic monomer. The homopolymer may, for example, be a polyDADMAC, a polyMAPTAC, a polydimethylaminoethylmethacrylate, a polydimethylaminoethylmethacrylate sulfate salt or a polydimethylaminoethylacrylate, or a polydimethylaminoethylacrylate sulfate salt or a polydimethylaminoethylmethacrylate methyl chloride quaternary salt, a dimethylaminoethylacrylate methyl chloride salt, and the like. When the quaternized or acid salts of these types of vinylic cationic monomers are used, it is to be understood that the homopolymer and/or the copolymer of these salts may be originally made using the non-quaternized materials followed by quaternization with standard quaternizing agents such as methylchloride, methylbromide, dimethylsulfate, or salted with HCl, $H_2SO_4$, acetic acid or the like, after the polymerization has been completed.

In addition to the quaternizing agents mentioned above, amine containing monomers which have not been quaternized may still be positively charged by neutralization with organic or inorganic acids such as HCl, $H_2SO_4$, acetic acid, nitric acid, and the like. When this neutralization occurs, the basic nitrogen in the monomer is positively charge by reacting with a free proton from the acid moiety used to accomplish the neutralization. In a similar fashion, these same acids and quaternizing agents may be used to form cationic monomers which are subsequently polymerized to form either the homopolymer or the copolymers of this invention.

The admixture may be made either by polymerizing the homopolymer separately and admixing with a copolymer manufactured separately, or they may be made in a sequential manner. The weight ratio of homopolymer to copolymer is preferably between about 50:1 to 1:50 and is most preferably between about 10:1 to 1:10. The polymers of this invention may be synthesized as solution polymers, condensation polymers, water-in-oil emulsion polymers as in Anderson/Frisque, U.S. Pat. No. Re. 28,474 and U.S. Pat. No. Re. 28,576, and may be used as such, or may be admixed in a separate step to achieve the compositions of this invention.

In addition, the polymer admixture used to treat and clarify badly contaminated waters containing oily waste matter and dispersed organic or inorganic solids may also advantageously contain multivalent metallic salts such as ferrous or ferric chloride, aluminum chloride, zinc chloride, manganese nitrate, magnesium chloride, calcium chloride, and the like. The choice of anion is immaterial and is made primarily on an economic basis. Chloride salts are preferred but nitrate, sulfate, phosphate anion may be present if the corresponding multivalent metallic salt is sufficiently water-soluble.

The addition of these multivalent metallic salts may derive even more improvement of water qualities when used in admixture with the cationic polymer admixtures of this invention. To better describe and exemplify the inventions contained within this disclosure, the following examples are presented.

In all of the examples to follow, the following Glossary shall apply to the identification of the materials used.

| | GLOSSARY |
|---|---|
| M | = 1,000 |
| MM | = 1,000,000 |
| AcAm | = Acrylamide |
| DMAEM | = Dimethylaminoethylmethacrylate |
| HMDA bttms | = Hexamethylenediamine tower bottoms residue |
| epi | = epichlorohydrin |
| MO—epi | = cross-linking agent containing ethylene oxide/propylene oxide condensation polymer having molecular weight between 100–5000, finally capped with epichlorohydrin. |
| DMAEM DMS quat. | = Dimethylaminoethylmethacrylate quaternized with dimethyl sulfate. |
| DACHA Hcl | = Diallylcyclohexylamine hydrochloride |
| TEA | = Triethanolamine |
| HMDA | = Hexamethylene diamine |
| $NH_3$ | = ammonia |

-continued

| GLOSSARY | |
|---|---|
| EDC | = 1,2 ethylene dichloride |
| DADMAC | = Diallyl dimethyl ammonium chloride |
| DMAEA | = Dimethyl aminoethyl acrylate and/or its acid salts |
| MAPTAC | = Methacrylamidopropyl trimethyl ammonium chloride |
| AMPIQ | = 1-acrylamido-4-methyl piperazine (quaternized with MeCl, MeBr, or Dimethyl Sulfate) |
| DEAEA | = Diethylaminoethyl acrylate and/or its acid salts |
| DEAEM | = Diethylaminoethyl methacrylate and/or its acid salts |
| DMAEAcAm | = Dimethylaminoethyl acrylamide and/or its acid salts |
| DMAEMAcAm | = Dimethylaminoethyl methacrylamide and/or its acid salts |
| DEAEAcAm | = Diethyl aminoethyl acrylamide and/or its acid salts |
| DEAEMAcAm | = Diethyl aminoethyl methacrylamide and/or its acid salts |
| Activity | = weight % of active polymeric ingredient |

TABLE I

| Compound | Chemical Description | | Molecular Weight/Activity |
|---|---|---|---|
| A | Copolymer of AcAm and DMAEM $H_2SO_4$ salt | 30-35% 70-65% | 5-15 MM; 30-35% active |
| B | Copolymer of AcAM and DMAEM DMS quat | 30-35% 70-65% | 5-15 MM; 28-32% active. |
| C | (a) Condensate polymer HMDA/epi/ MO—epi | | (a) 3-5 M; 35-37% active |
| | (b) AcAm—DACHA copolymer a:b = 3:1 | | (b) 5-10 M; 35-37% active |
| D | TEA condensate quaternized with MeCl | | 3-5 M; 56% active |
| E | Compound D + $ZnCl_2$ at weight ratio 40:50 3-5 M; | | 65% active |
| F | HMDA/epi HCl salt | | 3-5 M; 40% active |
| G | F + $ZnCl_2$ 2:3 weight ratio | | 3-5 M; 40% active |
| H | $NH_3$/EDC + $AlCl_3$ at 1:2 ratio | | 3-10 M; 23% active |
| I | $H_2O$ solution homopolymer of DMAEM $H_2SO_4$ salt | | 500-800 M; 10% active |
| J | TEA condensate HCl salt | | 3-5 M; 35% active |
| K | 88% Compound I formulation 3% Compound A formulation Remainder-diluents & inert salts | | 500-800 M; 5-15 MM about 10-15% actives |

Using the polymers described above, tests were conducted on waters contaminated with oil and solid materials, both of an organic and inorganic nature, where such waters were clarified by the chemicals and/or combination of chemicals described.

Three types of contaminated waters were tested. The first type is typical oil field contaminated ground waters which normally appear in the oil-in-water emulsion form where said oil-in-water emulsion is contaminated by suspended organic and/or inorganic materials as well (referred to herein as "Produced Waters").

The second type of contaminated waters which were tested came from an ethylene quench process waste water derived from an industrial plant in the southwest part of the United States.

The third type of contaminated water was derived from an oil field operation which had been using various types of drilling mud formulations in the process of drilling for gas and/or oil.

The types of tests used were standard bottle tests or jar tests wherein a prescribed amount of active polymeric ingredient was added to the waste waters to be tested, shaken for a prescribed amount of time, and rated by the ability of the treated contaminated water to separate into phases which would allow decantation, filtration, or other means for separating the contaminations from the treated water.

In addition, three types of tests were run on each of the fluids. They were classified as bottle tests, jar tests, and a WEMCO test.

In the bottle test, contaminated water is added to a series of capped bottles to which then is added prescribed quantities of test solutions containing the active polymer ingredients of this invention. The bottles are capped and agitated, using a slow rolling mechanism, for a period of revolutions or for a prescribed constant number of shakes. After agitation, the bottles are set on a flat surface and water clarity and coagulation efficiency visually observed as a function of time. A numerical system ranging between 1-10 is used to rate the bottles with 1 being the best water quality and rate of and/or degree of coagulation and 10 being the worst. Finally, the bottles are agitated vigorously with from 50-100 vigorous rolls or shakes. Again, the bottles are set on flat surfaces and observed to record clarity of water and the speed and degree of coagulation. Again, the rating system between 1-10 is used with 1 being the best water quality, or best speed and degree of coagulation, and 10 being the worst.

When these contaminated waters are jar tested, the procedure is normally to obtain fresh samples of contaminated waters of whatever kind and add to a series of 1000 milliliter beakers about half the total beaker volume of the ground waters or contaminated waters to be tested. These beakers are placed under paddles provided by a gang stirrer kit and the paddles lowered into the fluid and each beaker stirred under exactly the same agitation conditions. Agitation is continued for approximately 3 minutes after which time the agitation speed is normally reduced to allow for coagulation and phase separation. The fluid contained in the beakers is examined for the rate of phase separation, the appearance of floc and the speed of formation of the floc, relative size and uniformity of floc formation, speed of settling after agitation is stopped, the clarity or lack of clarity of the supernatant fluids, and the like. Prior to beginning agitation or immediately following the start of the initial vigorous agitation, the desire amount of treatment chemical is added by means of pipette to each of the beakers.

The WEMCO test uses an electric motor which admixes the contaminated water with various kinds of dispersion gases, normally nitrogen and/or standard air, and accomplishes an aeration of the sample under excessive and vigorous agitation provided by the electric motor and rotary shaft with attached agitator blades. During the operation, samples of contaminated water are drawn into the WEMCO agitator system, vigorously admixed with dispersion gases, and pumped from the chamber in which the admixture is occurring into various beakers, jars, or bottles which allow a quiescent period for settling and coagulation to be measured. Treatment chemical is added as the contaminated water is drawn into the reaction chamber prior to the addition of dispersion gases or simultaneously with the addition of dispersion gases. A tachometer on top of the WEMCO unit is set at a proper RPM which may vary from about 900 to about 1800 RPM's depending on the fluid being tested and other conditions of the test. The agitation chamber normally is a clean glass bowl of approximately 2500–5000 milliliter capacity. Observations include how quickly foam forms and the general characteristics of the foam which may form. Observations also include how fast oil and solids begin forming and coagulating in a ring around the shaft cylinder which greets the water surface within the mixing bowl. After agitation for about 60 seconds, the electrical motor is switched off and the contaminated water is allowed to remain static without agitation for another 60 seconds. Again, observations are made to determine foam formation, foam breakage, oil coagulation, and coagulation of other contaminating solid material dispersed within the original contaminated water sample. After 60 seconds, a sample of the treated waters are taken by using a metal or plastic syringe from about ½ to about ¼ inch from the bottom of the rounded portion of the agitation bowl. This "thief" sample is placed in a clean bottle and examined closely for clarity. This sample may also be tested analytically for % transmission using a standard photoelectric device standard in the industry.

In the following Tables, a "produced water" is a standard oil field contaminated water normally having an oil-in-water waste emulsion character in which solid matter is also suspended. The solid matter may be of an organic and/or inorganic nature. Table II presents test results for the ratings achieved by bottle testing a standard produced water having various treatments. These treatments indicate the benefits of the combination polymer treatment described in this invention. Table III is a WEMCO test procedure, again using the same "produced water" as appears in Table II. Again, as can be seen, a blend of polymers as described above provides drastically improved water quality and coagulation results.

Table IV tests an ethylene quench water derived from an ethylene quench processing operation which was occurring in an oil refinery and chemical processing plant located in the southwestern part of the United States. This ethylene quench water was treated by the jar test procedure described above and ranked in the way prescribed in the Table. Again, the combination polymers of this invention indicate the improved results described in this invention.

Table V presents results which show the benefits of various blends of materials when treating drilling muds which had been diluted at a ratio of about 1:50 of drilling mud to water in the standard jar test described above.

In addition, Table VI contains data obtained on actual oil field "produced waters" from an oil recovery facility in the far western United States to test and evaluate a combination of cationic polymers described and claimed herein.

In addition to the data presented above, applicant anticipates that his cationic polymeric admixture and the method of using said admixture to clarify waste waters contaminated with oily waste and/or suspended matter or dispersed matter of an organic or inorganic nature might be synthesized from homopolymers and/or copolymers of diallyldimethylammonium chloride, methacrylamido propyl trimethyl ammonium chloride, and the like.

If one were to synthesize a homopolymer of DADMAC having a molecular weight ranging between about 2500–500,000 or 1,000,000, and admix this homopolymer with a copolymer of DADMAC and acrylamide or methacrylamide having a molecular weight ranging between 1,000,000–50,000,000 and, preferably, between about 5,000,000–35,000,000, and then treat contaminated waste waters described above with from 0.1–50 ppm of this admixture containing DADMAC, with the weight ratio of homopolymer to copolymer ranging between 50:1 to 1:50, one would expect to see improved results from the treatment of this admixture over the simple treatment with either of the ingredients of the admixture.

The same would be true if polymers containing MAPTAC were synthesized and admixed in a similar fashion as long as the treatment levels are those described above and the molecular weights and ratios of homopolymer to copolymer are those described above. In a similar fashion, improvements would be expected in the above polymer admixtures if these polymer admixtures contained additionally multivalent metallic salts such as iron salts, aluminum salts, zinc salts, mixtures thereof, and the like.

TABLE II

Oil-in-Water Waste Emulsions Ground Waters Produced Water Bottle Test

| Formula | Ratio | Rating 100 Shakes | 100 Shakes | 100 Shakes | 100 Shakes |
|---|---|---|---|---|---|
| Blank | 0 ppm | 10 | 10 | 10 | 10 |
| A | 0.3 | 10 | 9− | 9− | 9− |
| A | 0.35 | 10 | 9− | 9− | 9− |
| B | 0.3 | 10 | 10 | 9− | |
| C | 10 | 8 | 5 | 3 | 3 |
| C blended A | 9.7  0.3 | } 9 | 5 | 3+ | 3+ |
| D | 12.0 | 7 | 7 | 7 | 7 |
| D blended A | 11.65  .35 | } 7 | 7 | 7 | 6 |
| E | 10.0 | 7 | 5+ | 2 | 2+ |
| E blended A | 9.7  0.30 | } 6 | 2+ | 1 | 1+ |
| F | 10 ppm | 4 | 2− | 2+ | 1 |
| F blended A | 9.7  0.3 | } 4 | 2− | 2+ | 1 |
| G | 12 | 6 | 6 | 5 | |
| G blended A | 11.65  0.35 | } 5 | 4 | 3 | |
| H | 10 | 10 | 10 | 9 | 8 |
| H blended A | 9.7  0.3 | } 9 | 9 | 8 | 7 |
| Blank | 0 | 10 | 10 | 10 | |
| B | 0.3 | 10 | 9− | 9− | |
| A | 10 | 9 | 5 | 3 | |
| A blended B | 9.7  0.3 | } 8 | 4 | 2+ | |
| E | 10 | 8 | 7 | 4 | |
| E blended B | 9.7  0.3 | } 6 | 5 | 4+ | |

TABLE III

Produced Water
WEMCO Test Procedure Water

| Formula | Ratio | % Trans. |
|---|---|---|
| Blank | 0 | 50 |
| A | .36 ppm | 51 |
| D | 12 | 75 |
| D blended / A | 11.64 / .36 | 84 |
| I | 12.0 | 89 |
| I blended / A | 11.64 / .36 | 98 |
| G | 12 | 61 |
| G blended / A | 11.64 / .36 | 63 |

TABLE IV

Ethylene Quench Water (Jar Test)
(10 = Worst, 1 = Best)

| Formula | Ratio | Rating | |
|---|---|---|---|
| Blank | 0 | 7 | |
| A | 0.3 | 7 | no improvement over blank |
| B | 0.3 | 7 | no improvement over blank |
| I | 10 | 5 | |
| I blended / A | 9.7 / 0.3 | 4 | |
| I blended / B | 9.7 / 0.3 | 4 | |
| F | 10 | 4 | |
| F blended / A | 9.7 / 0.3 | 3 | |
| F blended / B | 9.7 / 0.3 | 4+ | |
| D | 10 | 4 | |
| D blended / A | 9.7 / 0.3 | 4 | |
| D | 9.7 | | |
| B | 0.3 | 4 | |
| E | 10 | 2 | |
| E blended / A | 9.7 / 0.3 | 2 | |
| J | 10 | 5+ | |
| J blended / A | 9.7 / 0.3 | 4− | |

TABLE V

Drilling Mud
10 mls Mud in 500 mls Water
(Jar Test)

| Formula | Ratio | Rating | |
|---|---|---|---|
| A | 3 ppm | 10 | |
| Alum | 100 ppm | 2 | |
| Alum blended / A | 97 ppm / 3 ppm | 2+ | large floc |
| HCl | 100 ppm | 3+ | |
| HCl blended / A | 97 ppm / 3 ppm | 3 | large floc |
| Alum blended / B | 97 ppm / 3 ppm | 2 | large floc |

TABLE VI

"Produced Water"
Coagulation and Clarification
Oil Field Ground Waters
Actual Tests following Commercial WEMCO Units

| Treatment | Treatment Ratio ppm actives | Rating (1 = Best, 10 = Worst) | |
|---|---|---|---|
| Blank | 0 | 10 | |
| Polymer I | 2.5 | 9 | |
| Polymer I | 5.0 | 9 | |
| Polymer I | 10.0 | 9 | |
| Polymer I | 20.0 | 7 | |
| Polymer A | 2.5 | 2 | |
| Polymer A | 5.0 | 1 | |
| Polymers A & I(K) | 5.0 | 4 | |
| Polymers A & I(K) | 10.0 | 1+ | clearly superior |
| Polymer A + I(K) | 10.0 (duplicate) | 1+ | clearly superior |
| Blank | 0 | 10 | |
| Polymer I | 1.0 | 4 | |
| Polymer I | 2.0 | 2 | |
| Polymer I | 3.0 | 2+ | |
| Polymer I | 5.0 | 1 | |
| Polymers A + I(K) | 1.0 | 2+ | |
| Polymers A + I(K) | 2.0 | 1 | |
| Blank | 0 | 10 | |
| Polymer I | 1.0 | 5 | |
| Polymer I | 2.0 | 1-2 | |
| Polymer I | 3.0 | 1 | |
| Polymer K (A + I) | 1.0 | 4-5 | |
| Polymer K (A + I) | 2.0 | 1 | |
| Polymer K (A + I) | 3.0 | 1+ | |
| Polymer A (different loading) | 1.0 | 1-2 | |
| Polymer J* | 1.0 | 5 | |
| Polymer J | 2.0 | 3 | |
| Polymer J | 3.0 | 2 | |
| Blank | 0 | 10 | |
| Polymer I | 1.0 | 2+ | |
| Polymer I | 2.0 | 1 | |
| Polymer K | 1.0 | 1 | |
| Polymer J | 1.0 | 5 | |
| Polymer J | 2.0 | 2− | |
| Polymer J | 3.0 | 1-2 | |
| Polymer K | 1.0 | 3+ | |
| Polymer K | 2.0 | 1-2 | |
| Polymer K | 3.0 | 1+ | clearly superior |
| Blank | 0 | 10 | |
| Polymer I | 1.0 | 8 | |
| Polymer I | 2.0 | 3 | |
| Polymer I | 3.0 | 2-3 | |
| Polymer I | 5.0 | 1-2 | |
| Polymer K | 1.0 | 5+ | |
| Polymer K | 2.0 | 2-3 | |
| Polymer K | 3.0 | 1+ | clearly superior |

*Polymer J = 90%–92% of 16% DMAEM sulfate salt homopolymer, MW = 100,000
8–10% of copolymer DMAEM sulfate salt —AcAm, MW = 5–15 MM

Having thus described our invention, we claim:

1. A method of coagulating and clarifying waste waters contaminated with oils and suspended inorganic and/or organic solids which comprises the steps:

I. Adding to said waste waters an effective amount of a cationic polymer admixture comprising:

a. a first water-soluble cationic homopolymer of a vinylic cationic monomer chosen from the group consisting of diallyldimethyl ammonium chloride, dimethylaminoethyl methacrylate and its acid or quaternary salts, methacrylamidoproply trimethyl ammonium chloride and 1-acrylamido-4-methyl piperazine, N-methyl quaternary salt, said homopolymer having a weight average molecular weight ranging between about 2,500–800,000, in admixture with, b. a second water-soluble cationic copolymer of acrylamide and a vinylic cationic monomer chosen from the group consisting of diallyldimethyl ammonium chloride, dimethylaminoethyl methacrylate and its acid or quaternary salts, methacrylamidopropyl, trimethyl ammonium chloride and 1-acrylamido-4-methyl piperazine, N-methyl quaternary salt, said second cationic copolymer having a weight average molecular weight ranging between about 1,000,000–50,000,000, wherein said polymer admixture contains a:b within a weight ratio of about 50:1 to 1:50, and thereby forming a treated waste water, and then, II. vigorously agitating said treated waste water with or without admixture of a dispersion gas, and then, III. allowing phase separation to occur forming a clarified water phase and a coagulated waste phase containing oils and suspended inorganic and/or organic solids, and then, IV. recovering and reusing said clarified water and either recycling said waste phase or discarding or destroying said waste phase.

2. The method of claim 1 wherein the effective amount of the cationic polymer admixture ranges between about 0.1–50.0 ppm of admixture based on total weight of waste waters.

3. The method of claim 1 wherein the cationic polymer admixture comprises:
  a. a first cationic homopolymer having a weight average molecular weight ranging between about 5,000–800,000, in admixture with
  b. a second cationic copolymer of acrylamide with a vinylic cationic monomer, said copolymer having a weight average molecular weight ranging between about 5,000,000–35,000,000, and wherein said admixture contains a:b within the weight ratio of 10:1 to 1:10.

4. The method of claim 3 wherein the vinylic cationic monomer for the homopolymer and the copolymer is the same and is chosen from the group diallyl dimethyl ammonium chloride, dimethylaminoethyl methacrylate and its acid or quaternary salts, and methacrylamidopropyl trimethyl ammonium chloride.

5. The method of claim 1 wherein the cationic polymer admixture also contains water-soluble salts of multivalent metallic cations from the group consisting of ferrous ion, ferric ion, aluminum ion, cupric ion, zinc ion, manganese ion, calcium, magnesium, and chromic ions, and the like.

* * * * *